March 26, 1957 K. G. SCHWARZ 2,786,897

MAGNETIC RECORDER

Filed March 28, 1952 4 Sheets-Sheet 1

Inventor:
Karl Georg Schwarz
By [signature] Atty.

Inventor:
Karl Georg Schwarz
By [signature] Atty.

Inventor:
Karl Georg Schwarz
By [signature] Atty.

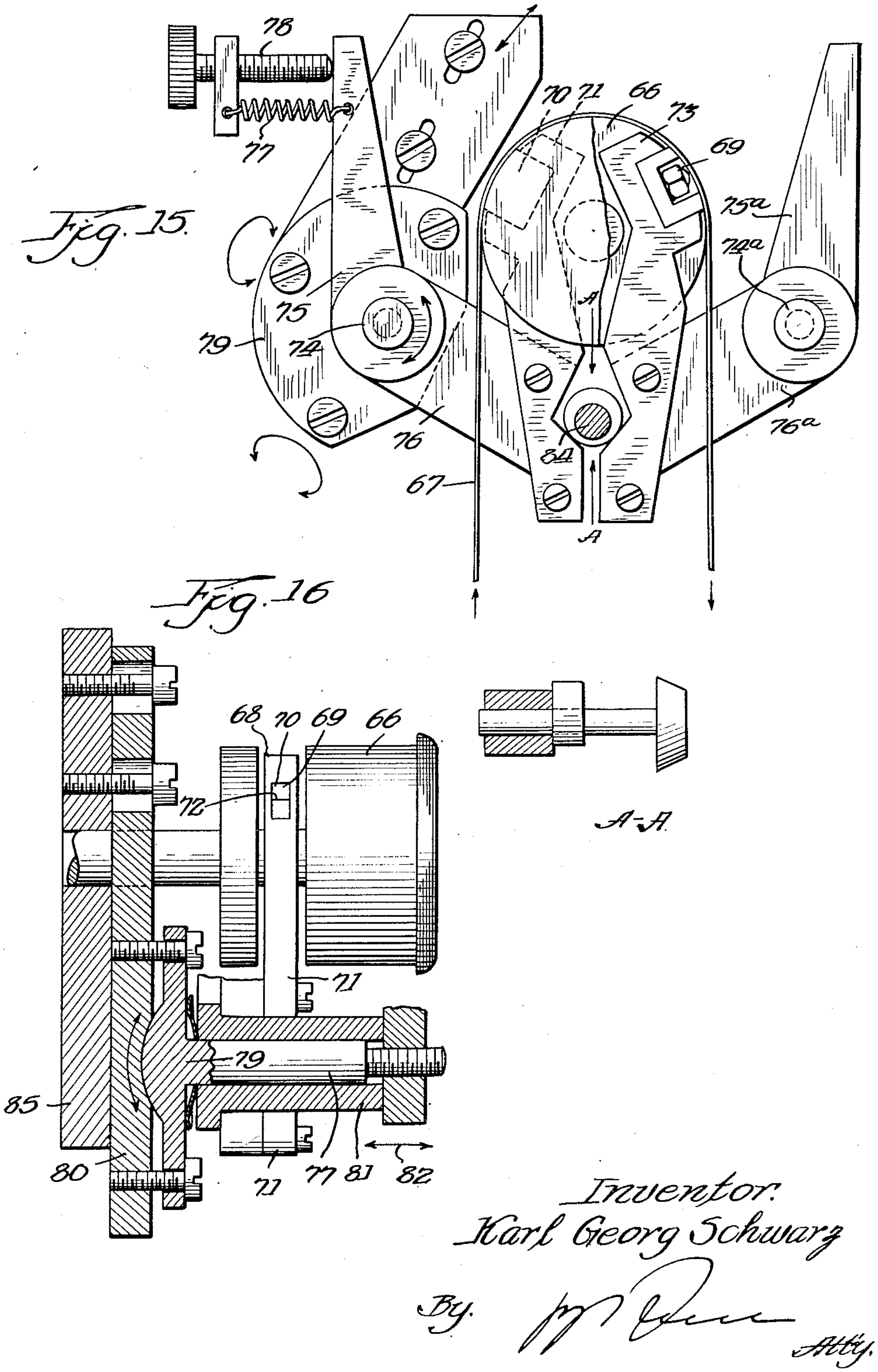
Fig. 15, Fig. 16, A-A
Inventor:
Karl Georg Schwarz
By. [signature] Atty.

United States Patent Office 2,786,897

Patented Mar. 26, 1957

2,786,897

MAGNETIC RECORDER

Karl Georg Schwarz, Erlangen, Germany, assignor to Siemens & Halske Aktiengesellschaft, Munich and Berlin, Germany, a corporation of Germany Application March 28, 1952, Serial No. 279,031

Claims priority, application Germany April 19, 1951

7 Claims. (Cl. 179—100.2)

This invention is concerned with magnetic heads for magnetic sound-recording and reproducing apparatus, and with the arrangement thereof in such apparatus.

The magnetic heads of the invention are intended for sound-recording and reproducing and also for erasing or cancellation of magnetic recordings, and are adapted for longitudinal as well as transverse magnetization of carriers made in the form of wires, tapes or films. The designation "magnetic recorder" is therefore intended to embrace recording as well as reproducing apparatus, and the designation "magnetic carrier" is intended to include magnetic tapes, wires, films or the like. One of the characteristic features of the invention has to do with the dimensioning and with the spatial form of the magnetic head and its position relative to the magnetic carrier.

An object of the invention is to construct and to dispose a magnetic head with respect to a magnetic carrier so as to provide for a zone of magnetic coaction which measures from the air gap between the pole pieces at least one-fourth of the wave length of the lowest frequency to be transmitted. The magnetic carrier may be within this zone partially or wholly in engagement with the pole faces of the recording or pickup head, or may be slightly spaced therefrom. The length of this zone of magnetic coaction must not exceed one-fourth of the wave length of the lowest frequency by any considerable amount. The reproducing qualities will deteriorate if it should be, for example, on the order of one-half wave length. This rule governs the construction of the magnetic head of the invention and its disposition with respect to the magnetic carrier.

The above noted rule may be satisfied either by constructing the head in substantially ring shape and by properly determining the embracing angle of the magnetic carrier, tape or wire with respect to the pole faces; or by forming the pole pieces so that each of the faces thereof has a length of $\lambda/4$, $\lambda$ signifying with respect to the magnetic carrier the wave length of the lowest frequency to be transmitted. The cores may in this zone of magnetic coaction be provided with a sharp bend so that they extend in a direction deviating considerably from the plane of the pole pieces formed thereby. The magnetic carrier may be arranged relative to the pole faces so as to provide for a particularly flat embracing angle or for straight tangential motion.

The magnetic head is preferably formed symmetrical to the gap between the pole pieces so that each of the two pole pieces has an effective zone of magnetic coaction of at least $\lambda/4$.

The foregoing and other objects and features will appear from the description of the accompanying drawings showing in diagrammatic manner several embodiments of the invention. In these drawings, Fig. 1 shows a magnetic head comprising two symmetrically disposed pole members forming sharp bends to form legs carrying the coils;

Figure 4:
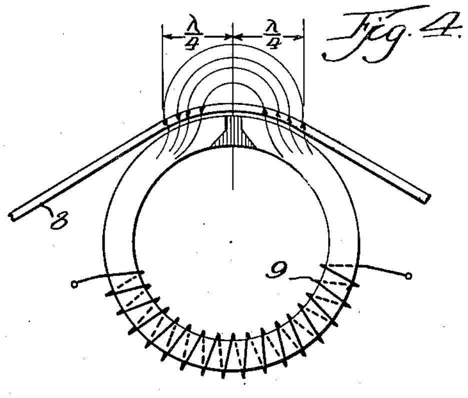
Figure 5:
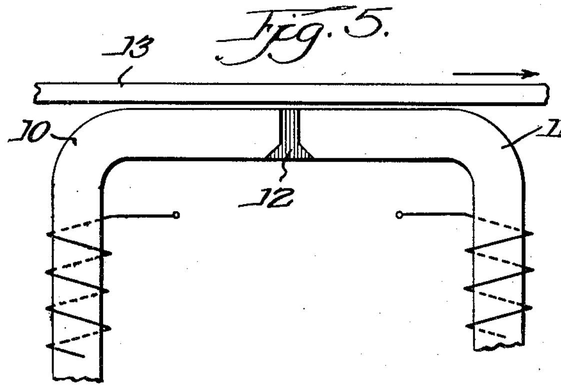
Figure 6:
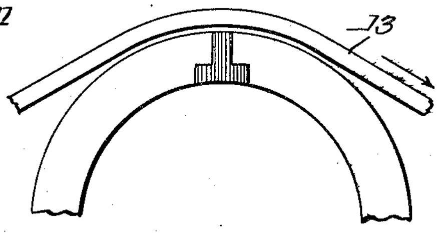
Figures 7, 8, 9, 10, 11:
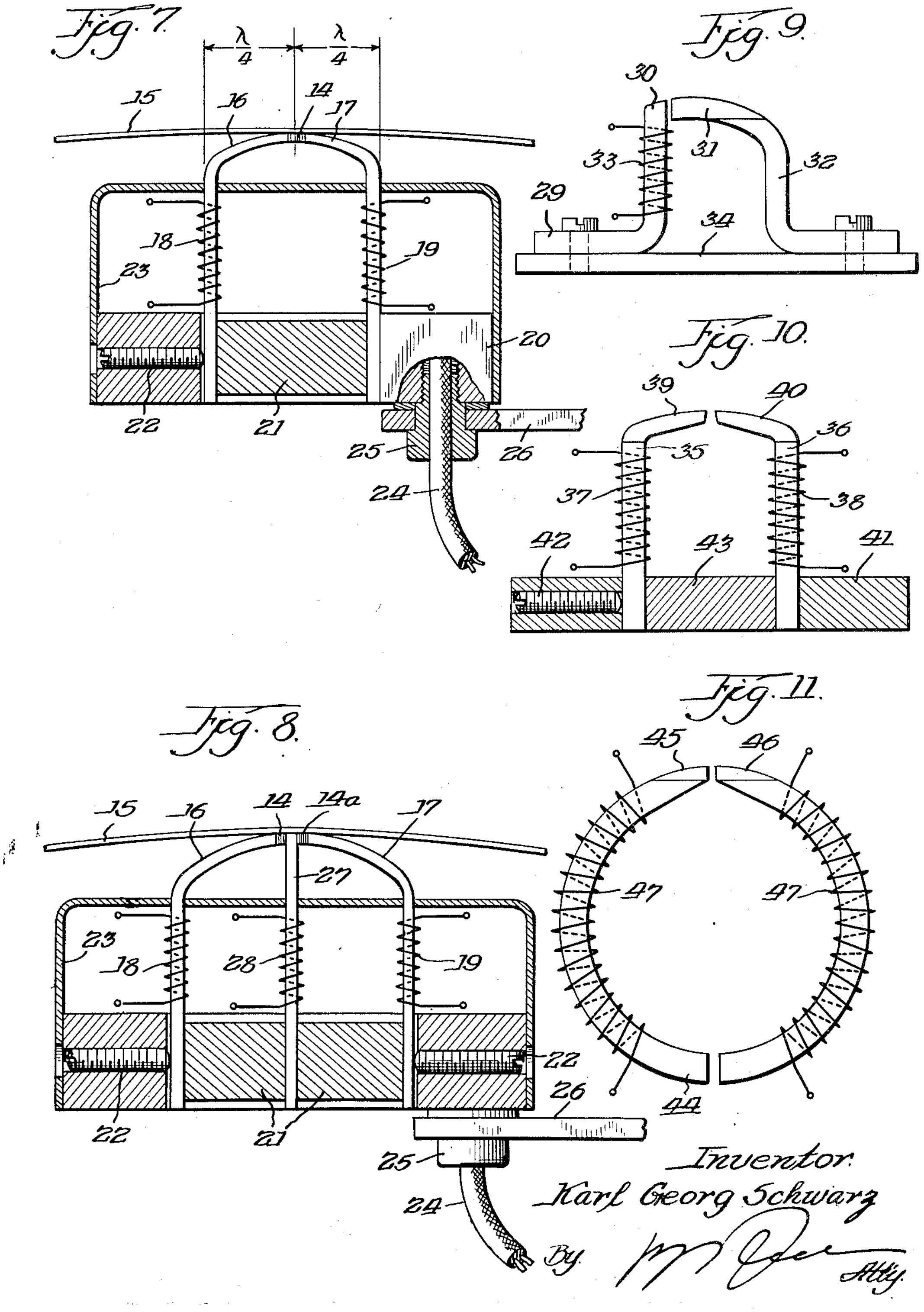
Figure 12:
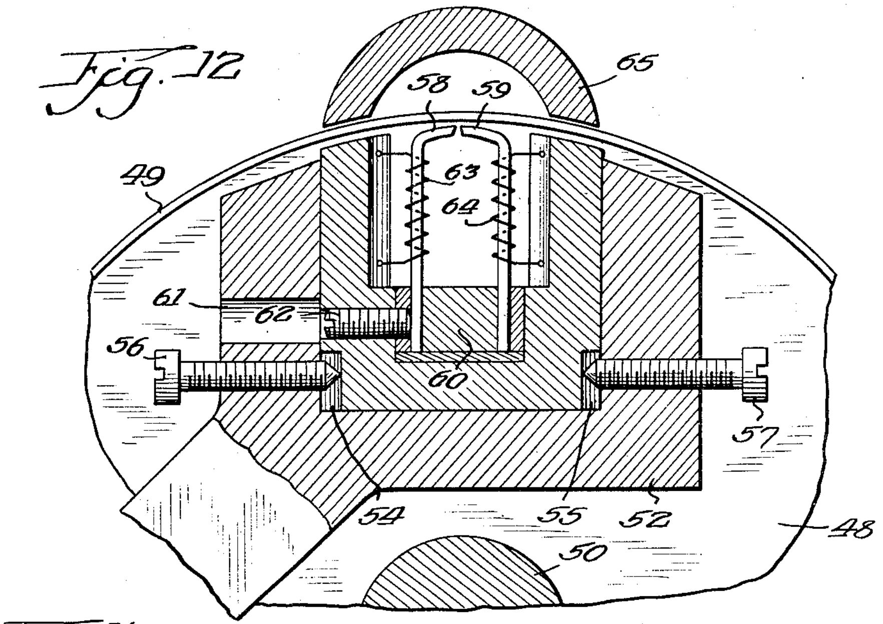
Figure 13:
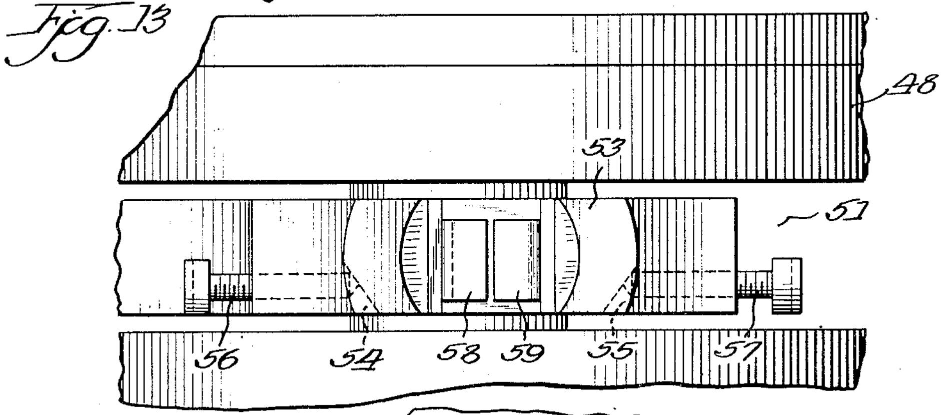
Figure 14:
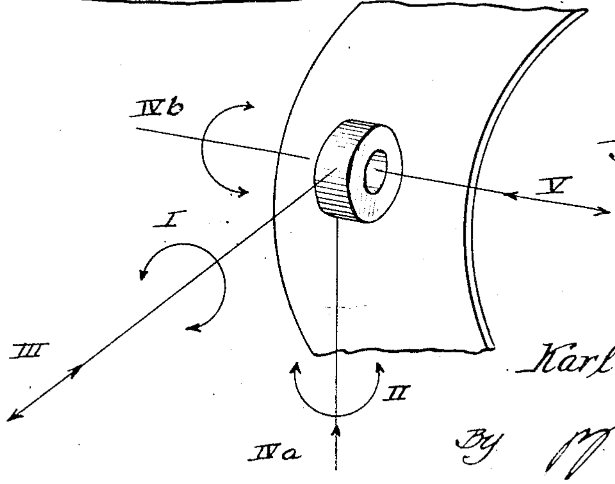

Fig. 4 indicates a ring-shaped magnetic head having a single winding;

Fig. 5 represents a magnetic head having pole pieces forming a gradually inwardly widening air gap filled with a nonmagnetic solderlike material;

Fig. 6 shows a magnetic head of the ring type having a stepped gap also filled with nonmagnetic material;

Fig. 7 is a symmetrically constructed head having a gap containing a nonmagnetic material such as hard solder, the magnetic carrier gliding relative thereto in sliding engagement therewith;

Fig. 8 is a modification of the structure of Fig. 7;

Fig. 9 shows a nonsymmetrical magnetic head;

Fig. 10 shows another form of a head of symmetrical structure;

Fig. 11 illustrates the use of a ringlike magnet;

Fig. 12 is a sectional view through a magnetic head and its mounting;

Fig. 13 is an elevational top view of the structure shown in Fig. 12;

Fig. 14 illustrates adjusting features;

Fig. 15 is a part elevational and part sectional top view of a further embodiment; and Fig. 16 is a part elevational and part sectional side view of Fig. 15.

Figure 1:
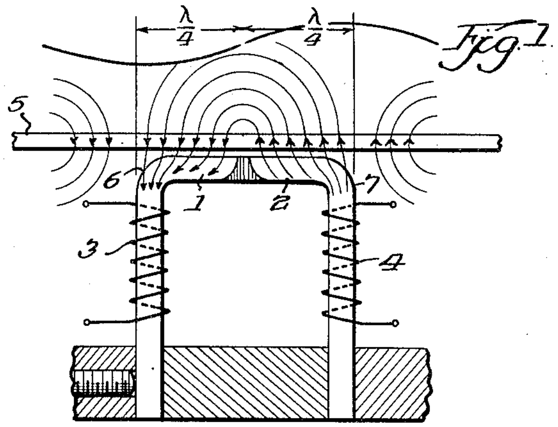

The head shown in Fig. 1 comprises two symmetrical magnetic pole members 1 and 2 each carrying a coil, as indicated at 3 and 4. The magnetic carrier 5 may be a tape which extends relative to the pole pieces of the head at a very flat embracing angle of nearly 180°. The tape may be in sliding engagement with the pole pieces or slightly spaced therefrom throughout a zone of magnetic coaction of $\lambda/4$ measured from the air gap between the poles. The two pole members are sharply bent at the regions indicated by the arrows 6 and 7 to form the legs carrying the coils 3 and 4. The legs thus extend in planes considerably deviating from the plane of the pole pieces which lie adjacent the carrier 5.

Figure 2:
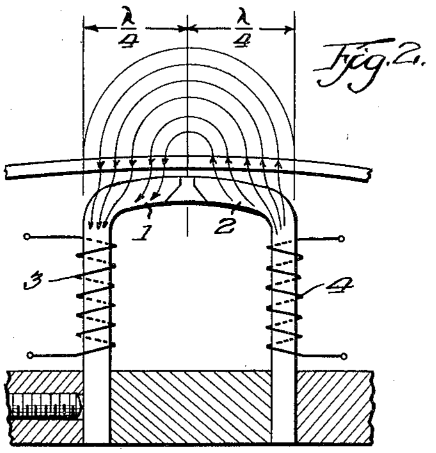
Fig. 2 illustrates an embodiment in which the bends in the two pole members are more gradual.

Fig. 2 shows an embodiment in which the pole members are more gradually bent to form the pole pieces 1 and 2 and the legs carrying the coils 3 and 4. The two coils are disposed vertically in parallel relationship, and their axes are spaced by an amount less than one-half wave length. Accordingly, the structure will cover the lines of force over a length amounting to $$2\times\frac{\lambda}{4}$$

of the magnetic tape.

Figure 3:
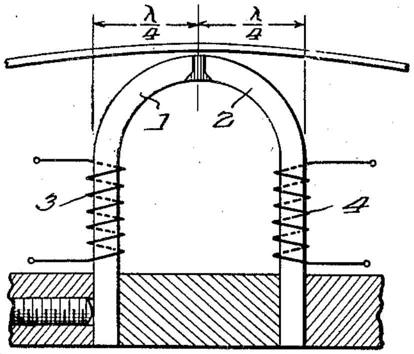
Fig. 3 shows arch-shaped magnetic pole pieces.

The embodiment shown in Fig. 3 operates in a manner similar as the structures of Figs. 1 and 2, having identical similarly disposed parts which coact as described, the only difference being in the archlike structure of the pole pieces forming the air gap adjacent the magnetic carrier.

Fig. 4 illustrates a ring-shaped magnet for a magnetic head according to the invention, which carries a single coil 9. The angle at which the magnetic carrier 8 embraces the pole pieces is determined by the position of the guide rollers (not shown), and the latter are therefore so disposed that the zone of magnetic coaction between the carrier and the poles of the magnet at the right and left of the air gap is again along an area amounting to $\lambda/4$.

A magnetic head according to the invention may be dimensioned and may coact with the magnetic carrier as follows: The speed of the carrier may be on the order of $v_B=450$ mm./sec. The wave length $\lambda$ which is recorded upon the carrier at a frequency of 50 cycles is then equal to 9 mm.; at a frequency of 40 cycles it will be equal to 11 mm. The effective zone of magnetic coaction $\lambda/4$ will therefore be 2.2 mm. at 50 cycles and 2.80 mm. at 40 cycles. The length of the magnetic head in the direction of motion of the carrier will be, respectively, about 4.5–5.5 mm. The height of the head will amount, respectively, to about 5–7 mm., and the width of the poles will correspond to the width of the magnetic sound track, namely, about 6 mm. or 2.5 mm. The magnet poles 1 and 2 preferably consist of high permeability ferromagnetic strips of about 0.35 mm. thickness.

The air gap of the head made in accordance with the invention for recording, reproduction and also for erasing is filled with a magnetic material such as brass, which is brazed to the pole pieces. This feature is of particular importance if the pole pieces are made of simple nonlaminated magnetic strip material.

A particularly favorable frequency response (curve) of the magnetic head is, in accordance with another feature, obtained by giving the pole pieces at the points where they form the gap a certain profile, for example, so that the gap at its outer region, where it faces the magnetic carrier, is relatively narrow, but widens inwardly gradually or in steplike manner in a direction away from the carrier.

The effect of such profile of the pole pieces is that the gap is very shallow at the zone of magnetic coaction with the magnetic carrier, and that the transmission becomes largely independent of the frequency.

However, the extent or depth of the gap adjacent the carrier cannot be arbitrarily reduced, because at a certain minimum the action of the carrier passing along the gap may grind off the material of the pole pieces. The invention therefore proposes to obtain a particularly favorable solution by the provision of a stepped gap filled with solderlike material and having a narrow portion which covers in excess of one-half or two-thirds to three-fourths of the total depth, while the remainder is formed by a wider inner portion.

Two examples illustrating this feature are shown in Figs. 5 and 6.

The pole pieces of the magnetic head shown in Fig. 5 are indicated at 10 and 11. They may correspond to the pole pieces employed in the structures indicated in Figs. 1 and 2. The gap is filled by brazing or solder 12. The magnetic carrier 13 moves along the pole pieces. The profile of the gap is formed as shown. There is a narrow outer zone having parallel sides and a gradually widening inner zone extending therefrom.

The structure shown in Fig. 6 employs a ring-shaped magnet which may correspond to the magnet indicated in Fig. 4. The narrow outer zone of the gap, which is filled with braze or solder, as before, amounts to about 70%, while the remaining, wider inner zone occupies about 30% of the total depth.

Additional features of the invention have to do with magnetic heads which are subject to wear by the grinding action of the magnetic carrier.

The invention proposes to avoid the drawbacks that may result from wear, by making the pole pieces exchangeable in such a manner that exchange and replacement may be carried out by the user without any experience or special skill and without any particular expenditure of time, the operation requiring no more skill than the exchange of a needle in a record player. The exchange of magnetic heads in prior structure required experience available only in special shops.

This object is realized in one embodiment in which one of the pole pieces forms a structural unit with its core, and the gap formed by solder or braze; that is, the pole piece and the core are made integral and exchangeable. If the magnetic head is symmetrical in a structure in which both pole pieces are subjected to equal wear, or if there are more than two pole pieces connected over a common gap, all of them will be made exchangeable as a unit.

Examples embodying these features will now be described with reference to Figs. 7 and 8.

Fig. 7 shows a part sectional view of a structurally symmetrical magnetic head having a gap 14 in which is disposed hard solder or the like. The magnetic carrier 15 glides along the gap 14, bearing very slightly on the pole pieces. The parts 16 and 17 are made of narrow strips in arcuate shape and form the pole pieces from which extend the core portions. The legs of these pole members carry the coils 18 and 19 which are mounted on the support 20. The two pole pieces are inserted into the support 20, and each is clamped therein against a centrally disposed block 21. The magnetic circuit is either over the support 20 or over the block 21. A screw 22 clamps the legs of the two striplike pole members in position. The gap 14 is filled, as before, by a nonmagnetic solder or brazing which holds the pole members as a unit. The axes of the two coils 18 and 19 are preferably spaced by one-half of the longest wave length to be recorded.

A metallic casing 23 covers and shields the structure. This casing has a hole in its wall for insertion of a screwdriver to reach the screw 22 when it is desired to remove the pole pieces.

The electrical connections are by way of a cable 24 which extends through the bushing 25. The latter is disposed in the support 20. The cable is rotatable relative to the bushing so as to carry out adjustments of the head relative to the magnetic carrier 15. From the bushing 25 extends the mounting or holder member 26.

Fig. 8 shows another embodiment in which the pole pieces are exchangeable. Numerals in Fig. 8, which are identical with those in Fig. 7, point to identical parts. The dimensioning of the parts as to wave length may follow the previously discussed rule. The structure of Fig. 8 differs from Fig. 7 by providing, in addition to the pole strips or members 16, 17, a central pole member 27 which extends into the gap formed by the arcuate pole members 16—17, thus forming two air gaps 14 and **14*a* which are filled with a nonmagnetic hard solder, as before. A third coil 28 is provided for the central pole member 27**. The resulting head may in known manner be used by the use of known selective circuits for recording, reproducing and for cancellation of recordings, or may be supplied with separately connected high- and low-frequency voltages, while the head of Fig. 7 may be employed either for recording or for reproducing or for cancellation, or in a suitable selective circuit for recording and for reproducing.

The embodiments just described with reference to Figs. 7 and 8 may be modified. For example, there may be in place of the shielding casing a structure forming potlike nonmagnetic side walls extending from a base plate which carries the cores and the coils.

The block 21 may be slotted so as to make it somewhat elastic. The screw 22 may in such a case extend into the slot of the block so as to spread it apart, the block acting as a wedge which clamps the legs of the arcuate pole members against the base plate.

Another modification is concerned with means for entirely eliminating the wear on the poles. Each pole piece which is affected by the sliding and wearing pressure of the magnetic carrier is made, at least at the point which would be subjected to wear, of a magnetic hard metal, for example, a metal available in trade under the name of "Widia." Such metal comprises a basic substance, for example, iron-nickel, or cobalt-nickel alloy, into which are sintered hard metal crystals. The composition must in the present case be selected so as to obtain sufficiently high permeability. Accordingly, there should be a great amount of basic substance containing only a few hard metal crystals sintered into it. Figs. 9, 10 and 11 show structure embodying these features.

Fig. 9 indicates a nonsymmetrical magnetic head. One pole piece 30 of this head is formed by the angularly shaped core member 29 carrying the coil 33. The other pole piece 31 extends from the magnetic part 32 which is, with the part 29, disposed on the common base 34. The pole piece 31 consists of a hard metal such as Widia. The parts 29, 30 and 32 are made of soft iron. The pole piece 31 is brazed to the iron part 32.

Fig. 10 indicates a structurally symmetrical head. Numerals 35 and 36 indicate iron cores carrying the coils 37 and 38. Each core 35 and 36 carries a pole piece, as indicated at 39 and 40, consisting of magnetic hard metal. The two pole pieces 39 and 40 may be soldered or brazed together across the gap formed thereby. The parts 35—36 and 39—40 thus form a structural unit which can be inserted into the base plate 41 and held thereon by the screw 42 which clamps the leg 35 against the block 43, the latter clamping the leg 36 against the base plate 41.

Fig. 11 indicates an embodiment comprising a ring-shaped magnet 44 forming two pole pieces 45, 46 of magnetic hard metal. The resulting head is excited by the two coils 47.

The dimensioning of the pole pieces of Figs. 9–11 and the coaction thereof with the associated magnetic carrier may again follow the rule as to wave length, as previously discussed. This rule may apply to all embodiments disclosed herein.

The manipulation of the magnetic head by inexperienced hands may damage the delicate structure thereof. In order to remove the resulting danger, the invention provides as a further feature a holder for removably securing the head. The holder may be removed and exchanged as a unit, or the pole pieces may be removed therefrom and exchanged as desired.

The magnetic head may be adjustably disposed on the holder so as to adjust the spacing of the gap from the magnetic carrier, or, rather to say, the sliding pressure of the carrier on the pole pieces. The holder may, in accordance with the invention, be of tubular cylindrical form so as to facilitate the adjustment. Screws may be provided which operate against angular surfaces formed on the casing of the head. The magnetic head may also be disposed on a fixedly secured pinlike member. The journalling of the head on its pin or its holder is preferably facilitated by the use of springs.

Figs. 12 and 13 show an embodiment which includes the above indicated features. Numeral 48 indicates a reel provided with a centrifugal mass for guiding the tape-like magnetic carrier 49. The reel is rotatably supported on a shaft 50 and is provided with a circular groove 51 which coincides with the sound track of the magnetic carrier. If there are several sound tracks there will be such a circular groove for each. Within the groove 51 is disposed the guide or holder 52 which is secured in position at a point outside of the reel 48. This guide or holder 52 forms a mounting which is provided with a cylindrical bore in which is disposed the casing 53 of the magnetic head. This casing is closed at the bottom, as indicated in Fig. 12.

Peripherally of the casing 53 are provided two angular surfaces 54 and 55 for coaction with associated adjusting screws indicated at 56 and 57. The two surfaces 54 and 55 extend at such angles as to provide for rotation of the casing 53 (head) in one direction responsive to tightening of one screw and loosening of the other, while causing rotation in opposite direction responsive to reversed screw operation. Within the casing 53 are the pole members forming the pole pieces 58 and 59. The gap between the pole pieces may again be filled with a nonmagnetic mass—solder or the like—as described before. The two pole members thus form a unit. Each of these members is a thin, narrow strip of rectangular cross-section and of a transverse width corresponding to the width of the sound track. The resulting unitary U-shaped structure is, as described before, exchangeable and is clamped in position on the base of the casing 53 by a block 60. The clamping screw 62 is accessible through a hole 61 in the adjustable holder 52. The two coils are indicated at 63 and 64. The axes of the coils are spaced by one-half of the longest wave length to be transmitted. The casing 53 is made of an iron alloy with high initial permeability. In the described example it may be made of Mu-metal. The shielding cap 65 which is, in accordance with a feature of the invention, provided outside of the roller 48, as shown, is made of a similar metal. This cap forms the upper closure for the casing 53. Only a small clearance is left between the cap 65 and the casing 53 for the reel 48 and the magnetic carrier 49. The block 60 also is made of a soft magnetic material of the kind of Mu-metal, while the holder 52 is made of a nonmagnetic material.

Another feature of the invention has to do with heads for magnetic recorders with guide reel and centrifugal mass serving as a backing and as a guide for the magnetic carrier which may be a tape or a sound film. It is known in apparatus of this kind to guide the tape-like carrier over a reel provided with a centrifugal mass and to provide within the reel one or more magnetic heads. The head thus coacts with the carrier from the inside of the guide reel. The guide roller may be made of two parts so as to introduce the magnetic head means thereinto. The drawback of such structure is in difficult operation and in the impossibility to remove the magnetic head during the rotation of the guide reel. The guide roller may also comprise two disks on a common shaft for supporting the magnetic tape or film marginally thereof. The drawback of such a structure is that the tape or film, particularly in the case of perforated structures, sags nonuniformly, thereby affecting coaction with the magnetic head because of nonuniform spacing of the carrier from the gap of the head.

The invention provides a guide reel containing one or more magnetic heads and having for such heads groove-like recesses into which the heads are fitted and into which they can be inserted from the outside without touching the guide reel. The structure provides for uniform spacing of the carrier from the pole pieces of the head and for ready exchangeability of the head. The magnetic head is in such embodiment not wider—or not considerably wider—than the sound track. An embodiment in which these features are incorporated will presently be described with reference to Figs. 15 and 16, after first explaining certain matters having to do with the the adjustment of the magnetic head with respect to the magnetic carrier.

The proper and accurate operation of the magnetic head depends largely on the proper alignment thereof with the magnetic carrier. Great care is taken in the assembly of apparatus of this kind to align the gap of the pole pieces properly with respect to the sound track of the carrier. Means have been proposed for adjustably arranging the magnetic head for the purpose of adjusting the gap parallel to and perpendicular to the direction of motion of the magnetic carrier. There is, however, no structure known that would permit carrying out, after completion of the assembly, all adjustments that have been recognized by the invention as necessary and desirable.

Accordingly, the invention provides a magnetic head which is independently adjustable in five distinct planes. These five adjustments may be realized either by two rotary motions and three translatory motions, or by three rotary motions and two translatory motions, as indicated in Fig. 14 by I–V, namely, I. The head may be adjusted rotatably around an axis extending perpendicular to the gap so as to obtain adjustment of the gap perpendicular to the direction of motion of the magnetic carrier;

II. The head may be rotatable about an axis which extends in parallel with the direction of motion of the magnetic carrier so as to obtain parallel adjustment of the gap to the plane of the carrier;

III. The head is movable in a translatory motion perpendicular to the plane of the magnetic carrier so as to obtain adjustment of the spacing of the gap from the carrier, and therewith sliding pressure thereon;

IV*a*. The head is movable in a translatory motion of the carrier for the purpose of obtaining symmetrical engagement of the carrier therewith at the right and left of the gap, it being assumed that the carrier extends in arcuate manner, for example, over a guide reel;

IV*b*. The head is for the same purpose as noted in "IV*a*" rotatable about an axis extending in parallel thereto, whereby the spacing of such axis from the gap may under certain circumstances be zero; and V. The head is movable in translatory motion parallel to itself and perpendicular to the direction of motion of the carrier so as to adjust it with respect to the sound track.

The independent adjustments provided in accordance with the invention, as indicated above and as shown in Fig. 14, secure proper and desired optimal operation of the magnetic head.

The adjustment noted under "II," above, may be eliminated in the case of magnetic carriers made in the form of wires. Four independent adjustments will then remain, one of which may be carried out by a rotary motion and three by translatory motions; or two of which may be carried out by rotation and two by translatory motion.

The adjusting means will now be described with reference to the embodiment shown in Figs. 15 and 16.

Numeral 66 indicates a guide reel (provided with a centrifugal mass) for guiding the tapelike magnetic carrier 67. The guide reel is provided with a groove 68 in which are disposed the magnetic heads 69 and 70. The head 70 is rotatably journalled in a holder 71 so that its gap 72 can be accurately adjusted in the five directions of adjustment relative to the tape, to position the gap 72 accurately with respect to the sound track. The magnetic head 69 is carried by a corresponding holder 73.

The holder 71 is mounted for pivotal swinging motion about the shaft 74 for adjusting the spacing of the head 70 with respect to the carrier 67. The adjustment is carried out by rotating the lever formed by the arms 71, 75 and 76 about the shaft 74. The arm 75 of this lever is pressed by the spring 77 against the adjusting screw 78, and rotating the screw will therefore result in angular displacement of the holder 71 and therewith of the magnetic head 70 perpendicular to the magnetic carrier 67.

The shaft 74 extends from a ball journal 79 which is in two directions rotatable in the socket 80. The head 70 and therewith the gap 72 may be pivotally displaced to the left and right about an axis extending perpendicular to the plane of the carrier 67 so as to obtain the proper perpendicular position of the gap. It may also be positioned accurately in parallel with the plane of the carrier by rotation about an axis extending in parallel with the direction of motion of the carrier. The bushing 81 which carries the arm 71 may finally be shifted in axial direction, as indicated by the arrow 82, for adjusting the gap 72 to the right or left so as to bring it into proper position relative to the sound track.

The socket 80 for the ball journal 79 is adjustably disposed on the barlike member 85 which is fixedly mounted on a stationary frame part so as to effect adjustment of the gap 72 relative to the plane of the magnetic carrier.

It will be seen that the magnetic head can be moved in two ways so as to adjust its gap 72 accurately perpendicular to the direction of motion of the carrier. First, it can be adjusted within its holder 71 at a time when the apparatus is not in operation; second, by a further adjustment during operation which is effected by angular displacement of the holder 71 in the ball-and-socket joint 79 and 80. The final adjustment may thus be advantageously carried out after hearing the operating results of the recorder. A microscope (not shown) having crossed filaments may be used for control purposes. The other magnetic head 69 is similarly adjustable by coaction of its holder 73 with the levers **76*a* and 75*a*, the latter being of course associated with adjusting means such as 77, 78**.

The journals and bearings should be made without play so as to avoid undesired displacement of the parts subsequent to adjustment thereof.

In addition to the adjustment by means of the levers 75—76 and **75*a*—76*a*, there is a rough adjustment means comprising the eccentric 84 which is operable by the knob 83 so as to move one or both of the magnetic heads 69, 70** relative to the magnetic carrier, for example, to space these heads from the carrier so as to put them in inoperative position.

Changes may be made within the scope and spirit of the appended claims.

What is claimed is:

1. In a magnetic recording and reproducing system, a magnetic head comprising angularly shaped core members assembled to form a generally U-shaped structure having at the base portion thereof pole pieces separated by a gap and legs extending from said base portion, and a device for removably mounting said U-shaped structure comprising a block of magnetic material disposed between the legs thereof, and clamping means for holding said legs in engagement with said block.

2. In a magnetic recording and reproducing system, a magnetic head having pole pieces and a magnetic carrier for coaction with said head, a holder for said magnetic head, means for rotatably adjustably mounting said head in said holder, means for securing said head in adjusted position, a generally cylindrical casing for mounting said head, angularly directed surfaces being formed in said casing, a tubular holder for said casing, and screw means coacting with said surfaces for adjusting the position of said casing and therewith of said head to adjust the position of said head relative to said magnetic carrier.

3. In a magnetic recording and reproducing system, a magnetic head having pole pieces and a magnetic carrier for coaction with said head, a holder for said magnetic head, means for rotatably adjustably mounting said head in said holder, means for securing said head in adjusted position, the width of the pole pieces of said head corresponding substantially to the width of the sound track on said magnetic carrier, a generally U-shaped casing for securing said head, the sides of the opposite arms of said casing being arcuately formed, and a reel for guiding said magnetic carrier having a groove formed therein for removably receiving said casing.

4. In a magnetic recording and reproducing system, a magnetic head having pole pieces and a magnetic carrier for coaction with said head, a holder for said magnetic head, means for rotatably adjustably mounting said head in said holder, means for securing said head in adjusted position, the width of the pole pieces of said head corresponding substantially to the width of the sound track on said magnetic carrier, a generally U-shaped casing for securing said head, the sides of the opposite arms of said casing being arcuately formed, a holder for said casing, means for angularly adjusting said casing in said holder to adjust the position of said pole pieces relative to said carrier, a reel for guiding said carrier having a groove formed therein for removably receiving said casing, and a shielding member disposed in alignment with said head outside said magnetic carrier.

5. In a magnetic recording and reproducing system, a magnetic head having pole pieces and a magnetic carrier for coaction with said head, a holder for said magnetic head, means for rotatably adjustably mounting said head in said holder, means for securing said head in adjusted position, the width of the pole pieces of said head corresponding substantially to the width of the sound track on said magnetic carrier, a generally U-shaped casing for securing said head, the sides of the opposite arms of said casing being arcuately formed, a holder for removably receiving said casing, means for adjusting the angular position of said casing in said holder to adjust said head relative to said magnetic carrier, means for adjusting the position of said holder with said casing and said head, and a reel for guiding said magnetic carrier having a groove formed therein through which said casing may be removed together with said head.

6. In a magnetic recording and reproducing system, a magnetic head having pole pieces and a magnetic carrier for coaction with said head, a holder for said magnetic head, means for rotatably adjustably mounting said head in said holder, means for securing said head in adjusted position, a shaft for pivotally adjustably mounting said holder, said shaft extending perpendicular to the motion of said magnetic carrier and parallel to the plane thereof, and a ball-and-socket joint for said shaft.

7. In a magnetic recording and reproducing system, a magnetic head having pole pieces and a magnetic carrier for coaction with said head, a holder for said magnetic head, means for rotatably adjustably mounting said head in said holder, means for securing said head in adjusted position, a shaft for pivotally adjustably mounting said holder, said shaft extending perpendicular to the motion of said magnetic carrier and parallel to the plane thereof, a ball journal formed on said shaft, a socket for said ball journal, and means for securing said socket for adjustment in a plane extending in the direction of motion of said magnetic carrier.

References Cited in the file of this patent

UNITED STATES PATENTS

| | | |
|---|---|---|
| 2,351,003 | Camras | June 13, 1944 |
| 2,428,449 | Camras | Oct. 7, 1947 |
| 2,432,162 | Jones | Dec. 9, 1947 |
| 2,456,767 | Camras | Dec. 21, 1948 |
| 2,481,393 | Camras | Sept. 6, 1949 |
| 2,483,123 | Clapp | Sept. 27, 1949 |
| 2,488,717 | Eilenberger | Nov. 22, 1949 |
| 2,493,742 | Begun | Jan. 10, 1950 |
| 2,530,584 | Pontius | Nov. 21, 1950 |
| 2,535,480 | Begun | Dec. 26, 1950 |
| 2,538,405 | Zenner | Jan. 16, 1951 |
| 2,549,771 | Camras | Apr. 24, 1951 |
| 2,553,290 | Bachman | May 15, 1951 |
| 2,563,445 | Zenner | Aug. 7, 1951 |
| 2,585,932 | Hall | Feb. 19, 1952 |
| 2,592,652 | Buhrendorf | Apr. 15, 1952 |
| 2,596,912 | Nygaard | May 13, 1952 |
| 2,628,284 | Friend | Feb. 10, 1953 |
| 2,632,816 | Gratian | Mar. 24, 1953 |
| 2,644,856 | Pettus | July 7, 1953 |
| 2,713,091 | Camras | July 12, 1955 |
| 2,715,659 | Ibuka | Aug. 6, 1955 |
| 2,735,900 | Wohlrab | Feb. 21, 1956 |